US010900513B2

(12) United States Patent
Diep et al.

(10) Patent No.: US 10,900,513 B2
(45) Date of Patent: Jan. 26, 2021

(54) RE-USABLE ONE-PUSH PIN AND GROMMET FASTENER

(71) Applicant: Newfrey LLC, New Britain, CT (US)

(72) Inventors: Tien The Diep, West Bloomfield, MI (US); Oday Amer Safry, Farmington Hills, MI (US); Aaron J. Smith, Hazel Park, MI (US); Najwan Rassam, Troy, MI (US)

(73) Assignee: Newfrey LLC, New Britain, CT (US)

( * ) Notice: Subject to any disclaimer, the term of this patent is extended or adjusted under 35 U.S.C. 154(b) by 0 days.

(21) Appl. No.: 16/373,275

(22) Filed: Apr. 2, 2019

(65) Prior Publication Data

US 2020/0318673 A1 Oct. 8, 2020

(51) Int. Cl.
*F16B 21/06* (2006.01)
*F16B 21/07* (2006.01)
*F16B 19/10* (2006.01)

(52) U.S. Cl.
CPC .......... *F16B 21/065* (2013.01); *F16B 21/075* (2013.01); *F16B 19/1081* (2013.01); *Y10T 24/309* (2015.01)

(58) Field of Classification Search
CPC .. F16B 19/1081; F16B 21/065; F16B 21/075; F16B 21/073; F16B 13/0858; F16B 13/0841; Y10T 24/30; Y10T 24/303; Y10T 24/309; Y10T 24/42
See application file for complete search history.

(56) References Cited

U.S. PATENT DOCUMENTS

| 6,364,586 | B1 | 4/2002 | Okada |
| 6,449,814 | B1 * | 9/2002 | Dinsmore ............... F16B 5/065 |
| | | | 24/289 |
| 6,769,849 | B2 | 8/2004 | Yoneoka |
| 6,868,588 | B2 | 3/2005 | Dickinson et al. |
| 7,188,392 | B2 | 3/2007 | Giugliano et al. |
| 7,237,995 | B2 | 7/2007 | Randez Perez et al. |
| 7,249,922 | B2 | 7/2007 | Yoneoka |
| 7,374,200 | B2 | 5/2008 | Ikeda et al. |
| 7,484,919 | B2 | 2/2009 | Hansen |

(Continued)

FOREIGN PATENT DOCUMENTS

DE 102010013612 A1 9/2011
JP 2003-222114 A 8/2003

*Primary Examiner* — Robert Sandy
*Assistant Examiner* — Michael S Lee
(74) *Attorney, Agent, or Firm* — Harness, Dickey & Pierce, P.L.C.

(57) ABSTRACT

A pin and grommet fastener includes a grommet that defines a central aperture and includes at least two adjacent longitudinally extending leg members that each include a frame, a knuckle and a tether. The knuckle is connected to the frame at a hinge region that is designed to permit the knuckle to move relative to the frame. The tether connects the knuckle to a base surface of grommet in order to limit movement of the knuckle relative to the frame. The fastener includes a pin that has a first locking member to retain the pin in a first position relative to the grommet in which the longitudinally extending leg members are in a laterally unexpanded state. The pin also has a second locking member to retain the pin in a second position relative to the grommet in which the longitudinally extending leg members are in a laterally expanded state.

23 Claims, 11 Drawing Sheets

(56) References Cited

U.S. PATENT DOCUMENTS

| | | |
|---|---|---|
| 7,841,817 B2 | 11/2010 | Kawai |
| 8,370,999 B2 | 2/2013 | Camus |
| 8,627,552 B2 | 1/2014 | Smith et al. |
| 8,950,043 B2 | 2/2015 | Hofmann |
| 9,027,973 B2 | 5/2015 | Kojima et al. |
| 9,080,588 B2 | 7/2015 | Diez Herrera et al. |
| 9,528,540 B2 | 12/2016 | Jamil et al. |
| 10,030,684 B2 | 7/2018 | Paquet |
| 2010/0088860 A1* | 4/2010 | Benedetti .............. F16B 5/0657 24/297 |
| 2010/0329815 A1 | 12/2010 | Jackson et al. |
| 2013/0039717 A1 | 2/2013 | Sasaki |
| 2013/0071201 A1 | 3/2013 | Watanabe et al. |
| 2013/0091669 A1 | 4/2013 | Sasaki |
| 2013/0199003 A1* | 8/2013 | Iwahara ................... F16B 2/22 24/530 |
| 2013/0287517 A1 | 10/2013 | Fujiwara |
| 2014/0093325 A1 | 4/2014 | Mizukoshi et al. |
| 2016/0047406 A1* | 2/2016 | Jamil ................. F16B 19/1081 411/48 |
| 2018/0148003 A1 | 5/2018 | Hubner |

\* cited by examiner

RE-USABLE ONE-PUSH PIN AND GROMMET FASTENER

FIELD

The present disclosure relates to re-usable one-push pin and grommet fasteners and related methods, and to such fasteners and methods having particular applicability attaching a component to a base component and otherwise joining components or panels in the automotive industry.

BACKGROUND

This section provides background information related to the present disclosure which is not necessarily prior art.

Pin and grommet fasteners are commonly used in the automotive industry. Use of a pin and grommet fastener typically requires insertion of the grommet into an aperture of a joining part. The pin typically must additionally be both inserted into an aperture of the grommet and seated within the grommet aperture. Seating the pin within the grommet causes legs of the grommet to expand laterally and lock the pin and grommet to the joining part. Thus, in known grommet and pin fasteners, the pin typically must be seated within the grommet as a separate step or operation that must be done after the grommet is inserted into the aperture of the joining part.

In some cases, the pin can be assembled to the grommet with the pin retained in a partial, temporary, or shipping position within the grommet. This pin and grommet fastener assembly can then be shipped to a manufacturing plant. Thus, the end user need only handle a single assembly, and does not need to manage separate pin and grommet components. Such an assembly eliminates the need for the end user to initially insert the pin into the aperture of the grommet. Nevertheless, the pin and grommet assembly typically must still be inserted into the aperture of the joining part, and the pin must still be seated within the grommet as a separate step or operation that typically must be done after the pin and grommet assembly is inserted into the aperture of the joining part.

It can be desirable to insert such pin and grommet fasteners into joining parts manually without the need for tools or fixtures. Existing pin and grommet fasteners, however, can require high insertion forces to drive the fasteners into a seated and locked position. Steps taken to reduce the required insertion force of a pin and grommet fastener can often be accompanied by an undesirable reduction in the retention capability of the fastener.

In addition, pin and grommet fasteners can be used in applications to join components that may need servicing and/or repair. In such cases, it is desirable that the pin and grommet fasteners are not permanently damaged during their removal. If it is, the damaged pin and grommet fastener is required to be replaced during service or repair of the joined components. Such replacement can increase service and repair costs and can lead to unnecessary increases in inventory for dealers and service providers.

SUMMARY

This section provides a general summary of the disclosure, and is not a comprehensive disclosure of its full scope or all of its features.

In accordance with one aspect of the present disclosure, a pin and grommet fastener can include a pin and a grommet. The grommet can define a central aperture and can include at least two adjacent longitudinally extending leg members that each include a frame, a knuckle and a tether. The knuckle can be connected to the frame at a hinge region that is designed to permit the knuckle to move relative to the frame. The tether can connect the knuckle to a base surface of grommet in order to limit movement of the knuckle relative to the frame. The pin can have a first locking member in the form of one of a first recess and a first protrusion that engages a first cooperating locking member of the grommet in the form of the other one of a first recess and a first protrusion to retain the pin in a first position relative to the grommet in which the longitudinally extending leg members of the grommet are in a laterally unexpanded state. The pin also can have a second locking member in the form of one of a second recess and a second protrusion that engages a second cooperating locking member of the grommet in the form of an opposite one of a second recess and a second protrusion to retain the pin in a second position relative to the grommet in which the longitudinally extending leg members of the grommet are in a laterally expanded state. The knuckle can also include a retention surface that is designed to engage an edge of a joining aperture in a joining panel to retain the grommet to the joining panel when the pin is in the second position.

In accordance with another aspect of the present disclosure, a pin and grommet fastener can include a grommet defining a central aperture that includes at least two adjacent longitudinally extending leg members. Each of the longitudinally extending leg members can include a frame and a knuckle connected to the frame at a hinge region. The knuckle can be designed to move laterally toward the central aperture relative to the frame at the hinge region when the pin and grommet fastener is inserted into a joining panel. The pin can include a first locking member in the form of one of a first recess and a first protrusion that engages a first cooperating locking member of the grommet in the form of an opposite one of a first recess and a first protrusion to retain the pin in a first position relative to the grommet in which the at least two adjacent longitudinally extending leg members of the grommet are in a laterally unexpanded state. The pin also can include a second locking member in the form of one of a second recess and a second protrusion that engages a second cooperating locking member of the grommet in the form of an opposite one of a second recess and a second protrusion to retain the pin in a second position relative to the grommet in which the at least two longitudinally extending leg members of the grommet are in a laterally expanded state. Each knuckle can include a retention surface on a lateral outer surface and at least a portion of the retention surface can be positioned laterally outward of the frame to engage an edge of a joining aperture in the joining panel to retain the pin and grommet fastener relative to the joining panel when the pin is in the second position.

In accordance with yet another aspect of the present disclosure, a pin and grommet fastener can include a grommet defining a central aperture that can include at least two adjacent longitudinally extending leg members. Each of the at least two adjacent longitudinally extending leg members can include a frame, a knuckle and a tether. The knuckle can be joined to the frame at a distal end of the knuckle and can be spaced apart from the frame along at least a portion of longitudinally extending sides of the knuckle. The knuckle can be designed to move laterally inward relative to the frame. The tether can extend between a proximal end of the knuckle and a base surface of the grommet to limit lateral outward movement of the knuckle relative to the frame. The pin can include a first locking member in the form of one of a first recess and a first protrusion that engages a first cooperating locking member of the grommet in the form of an opposite one of a recess and a protrusion to retain the pin in a first position relative to the grommet in which the at least two adjacent longitudinally extending leg members of the grommet are in a laterally unexpanded state. The pin also can include a second locking member in the form of one of a second recess and a second protrusion that engages a second cooperating locking member of the grommet in the form of an opposite one of a second recess and a second protrusion to retain the pin in a second position relative to the grommet in which the at least two adjacent longitudinally extending leg members of the grommet are in a laterally expanded state. The pin can further include a driving protrusion extending laterally outward beyond sides of the at least two adjacent longitudinally extending leg members. The driving protrusion can be designed to be automatically engageable against a periphery of a joining aperture of a joining part during insertion of the pin and grommet fastener into the joining aperture to drive the pin from the first position to the second position relative to the grommet to lock the pin and grommet fastener to the joining part.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
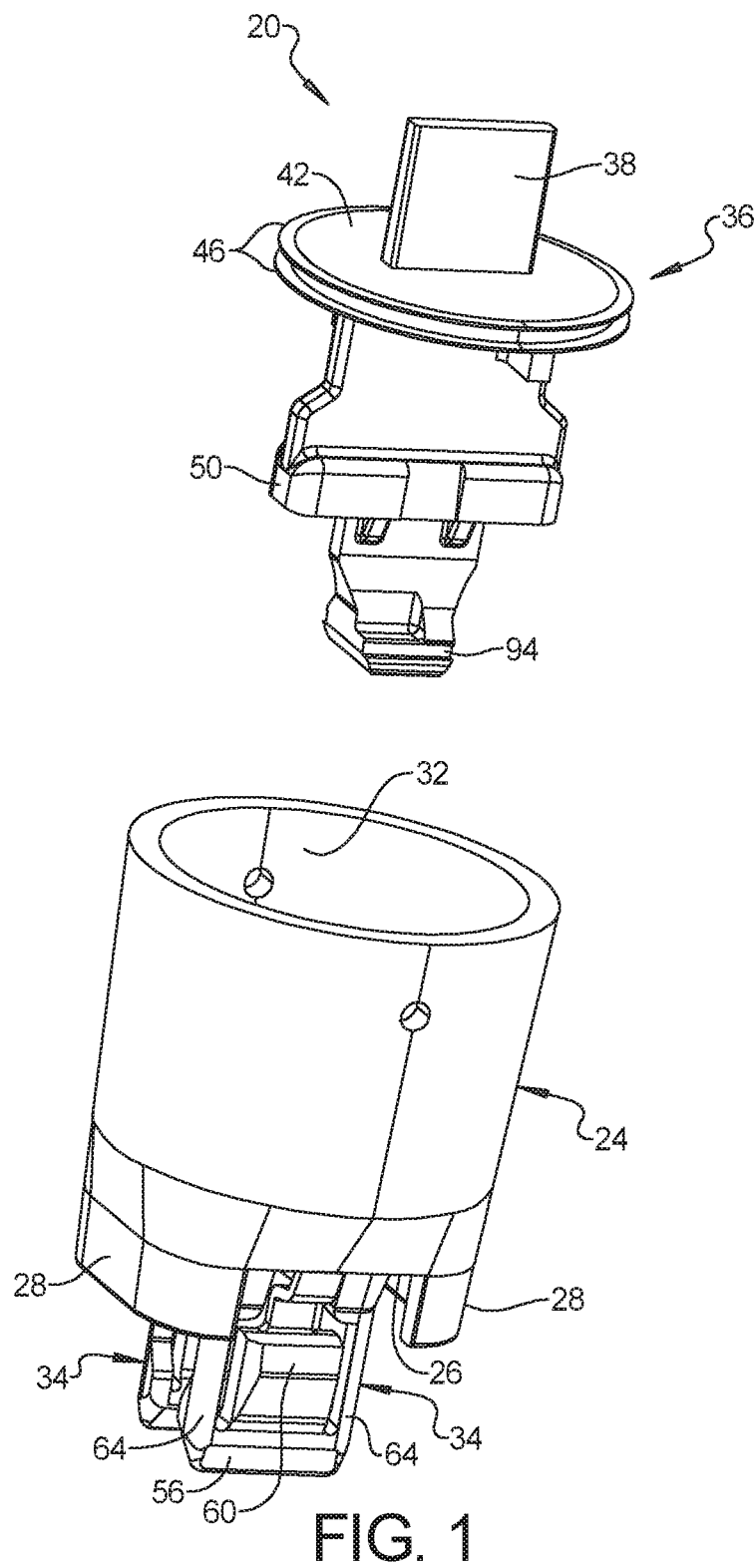
FIG. 1 is an exploded perspective view of one example of a pin and grommet fastener in accordance with the present disclosure.
Figure 2:
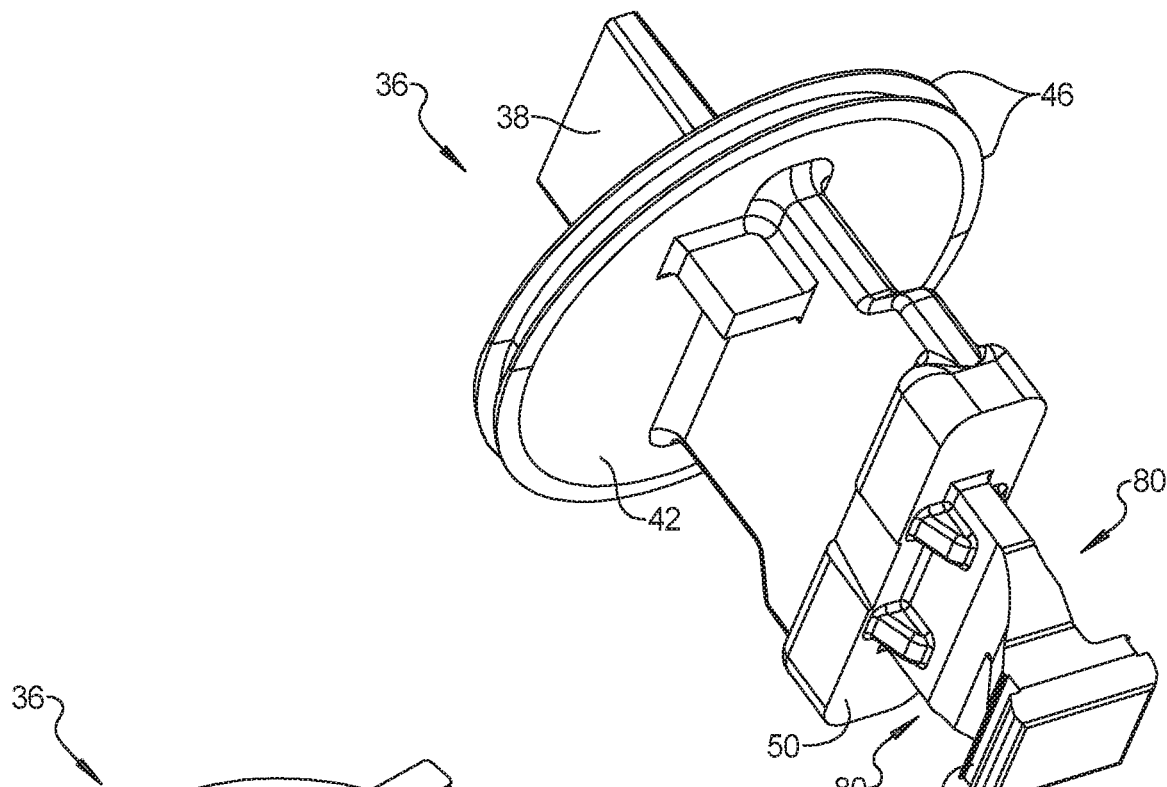
FIG. 2 is a perspective view of a pin of the pin and grommet fastener of FIG. 1.
Figure 3:
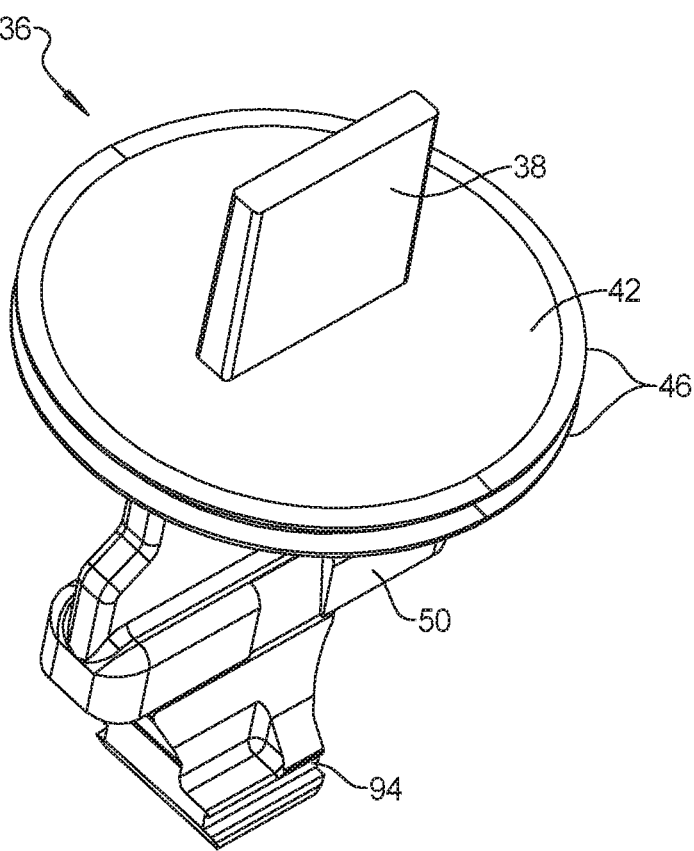
FIG. 3 is another perspective view of the pin of the pin and grommet fastener of FIG. 1.

Example embodiments will now be described more fully with reference to the accompanying drawings.

Referring to FIGS. 1-12B, one exemplary embodiment of a pin and grommet fastener 20 that locks simultaneously with insertion into a joining part, member or panel 22 is illustrated. The grommet 24 can be a separate fastener component, or can be integrally molded as part of a larger component that is to be fastened to the joining part 22. The grommet 24 can include a base surface 26 and a central aperture 30 therethrough. The grommet 24 can additionally include one or more stanchions 28 that project away from the base surface 26. Resilient or flexible leg members 34 extend away from the base surface 26 in the same general direction as the stanchions 28. As shown, the leg members 34 and the stanchions 28 extend longitudinally below the base surface 26 (as oriented in the drawings). The leg members 34 can be positioned adjacent the central aperture 30 of the base surface 26.

The stanchions 28 can form a wall that surrounds at least a portion of the periphery of the base surface 26. As will be further explained, the stanchions 28 can be positioned against or near to the joining part 22 when the pin and grommet fastener 20 is secured at the desired location. In other examples, the stanchions 28 can have other shapes and sizes. In still other examples, the pin and grommet fastener 20 may not include the stanchions 28 and instead, the base surface 26 of the pin and grommet fastener 20 can be positioned against or near to the joining part 22 when the pin and grommet fastener 20 is secured at the desired location.

The pin 36 can include a service tab 38, a head 42, one or more sealing members 46, a locking bar 50, a first locking member 80 and a second locking member 94. The sealing members 46 can be molded to extend from a periphery of the head 42. In other examples, the sealing members 46 can be formed separately from the head 42. In such alternate examples (not shown), the sealing members can be longitudinally spaced from the head 42 and can have an umbrella shape or can have a flat flange shape. The sealing members 46, whether formed with or separately from the head 42, can be sized to seal inside a tubular portion 32 of the grommet 24. Such sealing members 46 can be molded of the same material as the remainder of the pin 36. As one possible alternative, the sealing member or members 46 can be molded of a more flexible material joined to the remainder of the pin 36, for example, using a two-shot molding process or an over-molding process.

Figure 7:
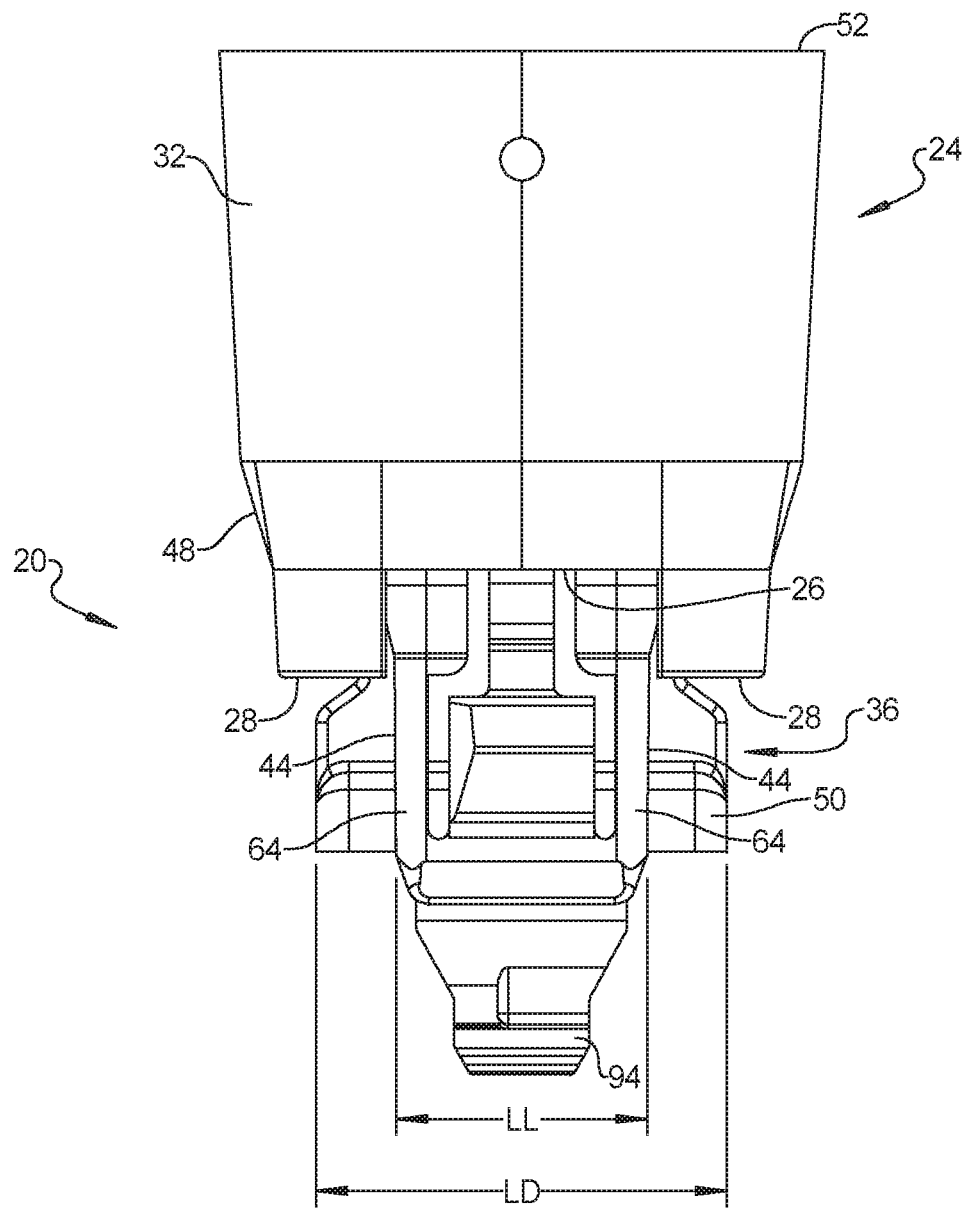
FIG. 7 is a side elevation view of the pin and grommet fastener of FIG. 1 with a top plan view of a joining part.
Figure 7:
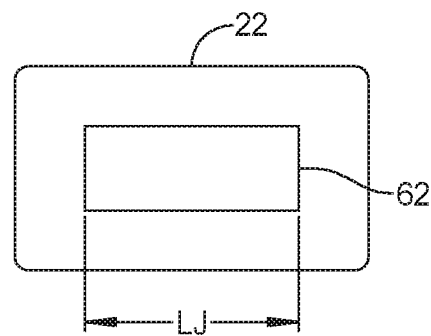
Figure 8:
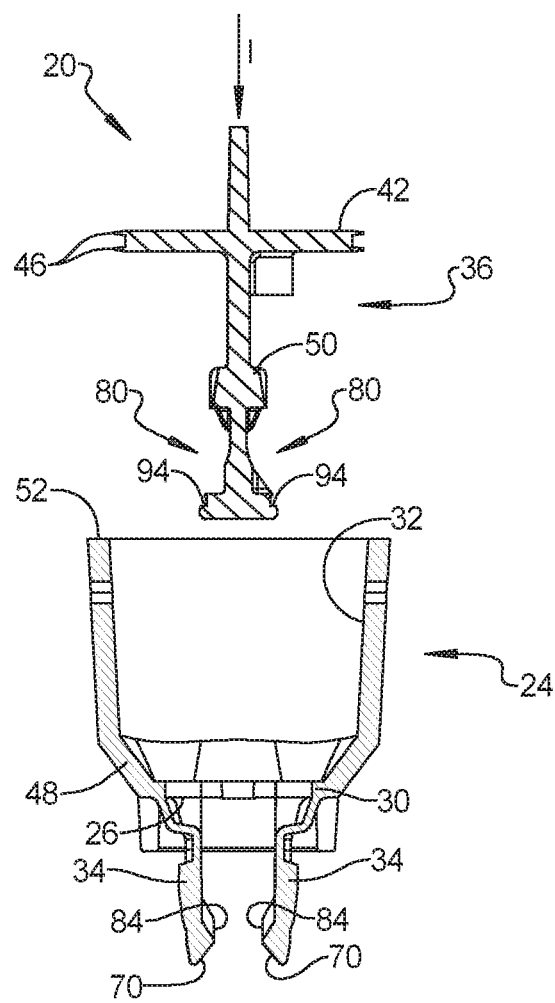
FIG. 8 is an exploded cross-sectional view of the pin and grommet fastener of FIG. 1.
Figure 9:
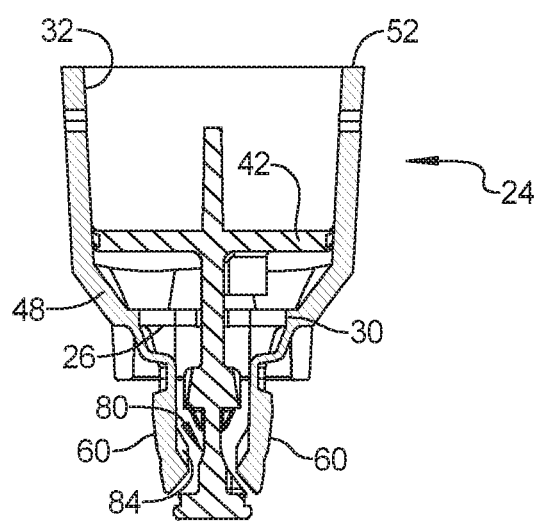
FIG. 9 is a cross-sectional view of the pin and grommet fastener of FIG. 1 in a first or shipping position.

The pin 36 can be inserted into the grommet 24 into a first, temporary, or shipping configuration as illustrated in FIGS. 7 and 9. In the embodiment shown, the pin insertion end 52 of the tubular portion 32 is above the base surface 26 as illustrated in the drawings. The tubular portion 32 can have a narrowed section 48 at or near a location at which the tubular portion 32 meets the base surface 26. An outer diameter of the head 42 can be larger than the inner diameter of the tubular portion 32 at the narrowed section 48. As such, the head 42 prevents the pin 36 from moving beyond the shipping position or configuration. In other examples, the tubular portion 32 can have a substantially constant size inner diameter along its length and the head 42 can prevent movement of the pin 36 beyond the shipping position or configuration by engaging a distal end of the tubular portion 32 at or near the base surface 26. Regardless of the configuration of the head 42 and the tubular portion 32, the pin 36 can be inserted into the tubular portion 32 and into the aperture 30 of the grommet 24 in a first insertion direction "I" as seen in FIG. 8. This insertion direction I extends in the axial or longitudinal direction of the tubular portion 32 of the grommet 24.

Each longitudinally extending leg member 34 includes a laterally inwardly extending protrusion or locking surface 84 which fits into a cooperating recess or narrowed portion 80 of the pin 36 (FIGS. 8 and 9). In this way, the pin 36 can be longitudinally positioned and retained relative to the grommet 24 in a first or shipping position with the leg members 34 of the grommet 24 in their laterally unexpanded state. Alternatively, of course, the cooperating recess 80 could be provided via the leg members 34 and a laterally outwardly extending protrusion could be provided on the pin 36.

The locking bar 50 of the pin 36 can extend through the lateral sides 40 of the central aperture 30 between the leg members 34. The lateral sides 40 of the central aperture 30 extend laterally past the sides edges 44 of the leg members 34. Thus, the locking bar 50 can have a lateral or side-to-side dimension LD that is greater than a corresponding lateral dimension LL of the leg members 34 so that the locking bar 50 extends past the leg members 34 (FIG. 7). Since the locking bar 50 passes through the central aperture 30 during initial insertion of the pin 36 into the grommet 24 in this example embodiment, the aperture 30 likewise has a lateral or side-to-side dimension LA (FIG. 6) that is greater than the corresponding lateral dimension LL of the leg members 34. Alternatively, a pin without a head could be inserted from below the base surface (as oriented in the drawings) so the locking member need not pass through the central aperture of the grommet.

The joining panel, part, or member 22 includes a joining aperture 62 (FIG. 7) into which the assembled pin and grommet fastener 20 is inserted. The joining aperture 62 into which the fastener 20 is to be inserted has a lateral or side-to-side dimension LJ that is less than a corresponding lateral dimension LD of the locking bar 50. A peripheral portion of the joining aperture 62 of the joining part 22 engages the locking bar 50 and moves the locking bar 50 in a locking direction indicated by arrow L (FIG. 11) as the pin and grommet fastener 20 is inserted into the joining aperture 62. Thus, the locking bar operates as a driving protrusion 50 that a periphery of joining aperture 62 engages to move the pin 36 from the first, temporary, or shipping position to the second locked position relative to the grommet 24 simultaneously with insertion into the joining part 22.

Figure 4:
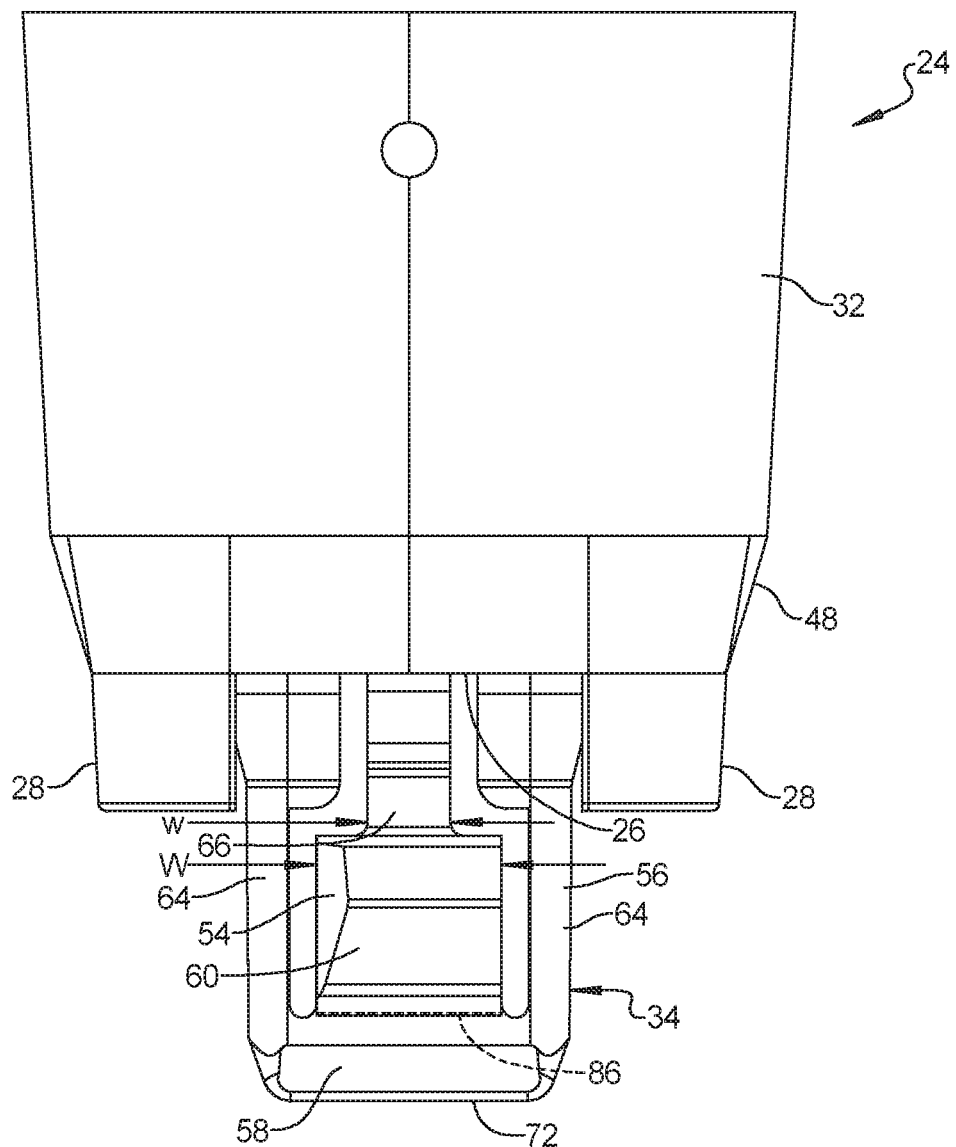
FIG. 4 is a side elevation view of a grommet of the pin and grommet fastener of FIG. 1.
Figure 5:
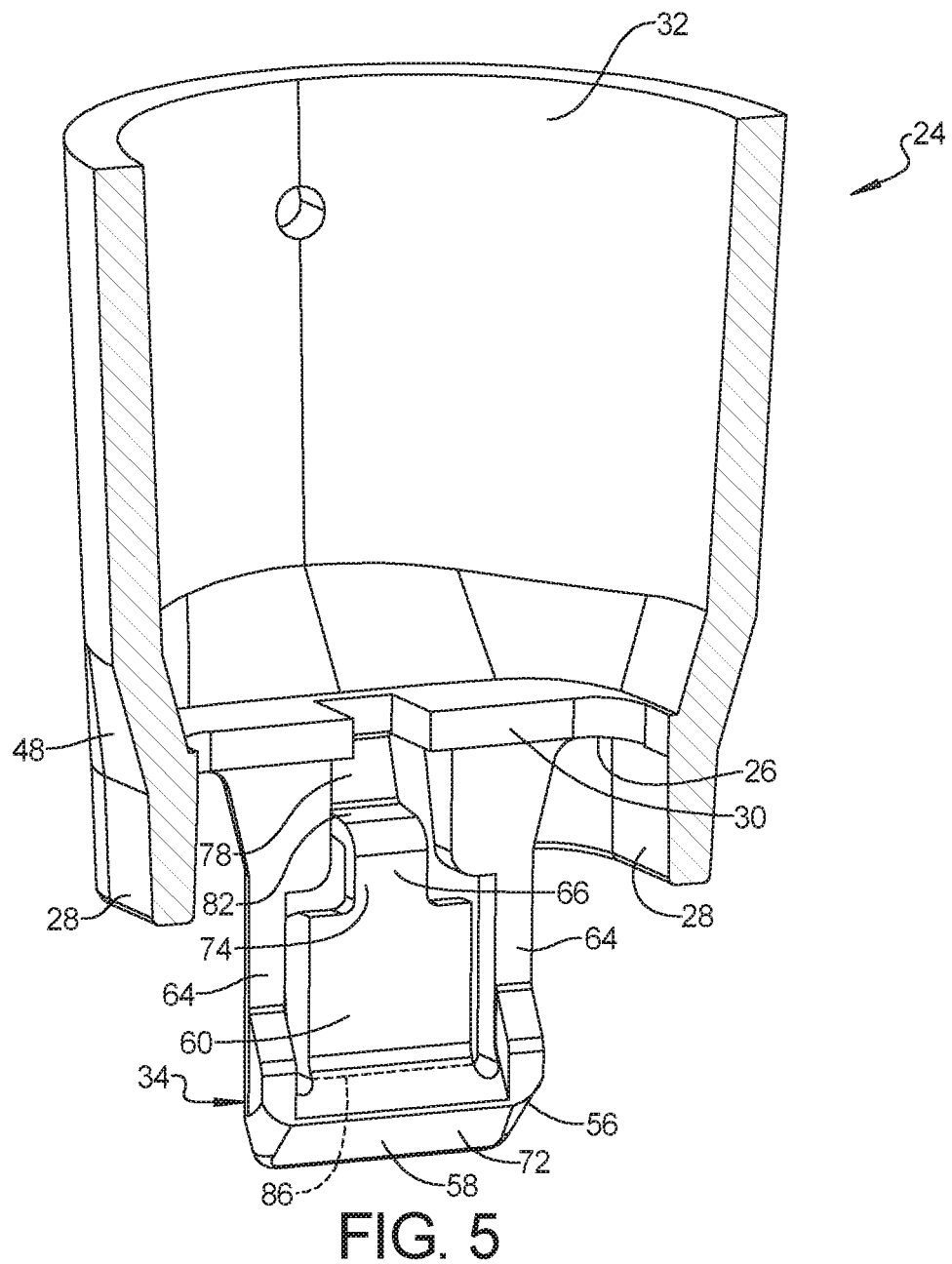
FIG. 5 is a perspective sectional view of the grommet of the pin and grommet fastener of FIG. 1.

As shown in FIGS. 4 and 5, each of the leg members 34 can include a frame 56 and a retention knuckle 60. In the example shown, the knuckle 60 is positioned between two longitudinally extending columns 64 of the frame 56. The knuckle 60 can be spaced apart from the columns 64 of the frame 56 on the opposing lateral sides of the knuckle 60. As shown, the knuckle 60 can be joined to the insertion side 72 of the frame 56. The insertion side 72 of the frame 56 is joined between the two opposing columns 64 by a crossbar 58 to define a U-shape. With this configuration, the knuckle 60 can move relative to the frame 56 by flexing at a hinge 86 that is defined at the intersection of the knuckle 60 and the crossbar 58 of the frame 56.

As stated above, the knuckle 60 can be spaced apart from the frame 56 along at least a portion of the periphery of the knuckle 60 to allow the knuckle to move relative to the frame 56. As will be further discussed below, this relative movement of the knuckle 60 and the frame 56 reduces the insertion force required to install the pin and grommet fastener 20. In other examples, the leg members 34 can include other configurations to permit the relative movement of the knuckle 60 to the frame 56. For example, the knuckle 60 can be joined to the frame 56 using flexible joints, living hinges or portions with reduced cross sections to permit relative movement.

The knuckle 60 can also include a bevel 54 positioned on one or both lateral sides. In the embodiment shown, the knuckle 60 includes one bevel 54 positioned on one lateral side. The bevel 54 can be a planar surface in the form of a ramp that is angled from an outer lateral side of the knuckle 60. The angled surface of the bevel 54 can remove a sharp corner from the lateral side edges of the knuckle 60. The bevel 54 can reduce an effective lateral width across the knuckle 60 and remove sharp corners from the knuckle 60 so that the knuckle 60 more easily disengages from the joining panel 22 during service or maintenance of the components to which the pin and grommet fastener 20 may be attached. In other examples, the bevel 54 can be included on both lateral sides of each knuckle 60. In still other examples, the bevel 54 can have the form of a chamfer or a radius along the lateral side edges of the knuckle 60.

Each of the leg members 34 can also include a tether 66 that connects the knuckle 60 to an adjacent portion of the grommet 24 to limit the movement of the knuckle 60 relative to the frame 56. As will be further discussed below, the tether 66 can assist in maintaining the integrity of the pin and grommet fastener 20 such that the pin and grommet fastener 20 can be reused after the servicing or repair of the parts that are joined by the fastener 20. In the example shown, the tether 66 connects a proximal end of the knuckle 60 located opposite the insertion side 72 of the frame 56 to the base surface 26. The opposite or second end of the tether 66 can be connected to the base surface 26 at a location laterally outward of the leg member 34 and/or laterally outward of the outer surface of the knuckle 60.

The tether 66 can have a reduced cross-section from that of the knuckle 60. The tether 66 can have a thickness and/or a width that is less than a thickness or width of the knuckle 60, particularly at the proximal end of the knuckle 60 to which the tether 66 can be joined to the knuckle. The tether 66 can have a thickness t (FIG. 12B) defined in an inward-outward direction relative to the frame 56. The knuckle 60 can have a thickness T defined in the same general inward-outward direction relative to the frame 56. As can be seen, the thickness t of the tether 66 can be less than the thickness T of the knuckle 60. The difference between the thickness t of the tether 66 and the thickness T of the knuckle 60 can result in the knuckle 60 being able to flex relative to the frame 56 in an inward and in an outward direction as will be further described. In the example shown, the thickness t of the tether 66 is less than one-half of the thickness T of the knuckle 60. In other examples, the ratio of the thickness t of the tether 66 to the thickness T of the knuckle 60 can have other values including less than two-thirds, less than one-third, or approximately one-half.

The tether 66 can also have a width w (FIG. 4) that is less than a width W of the knuckle 60. As shown, the tether 66 can have a width w defined in a direction laterally across the leg member 34. The knuckle can have a width W defined in the same general direction as the width w of the tether 66. In one example, the width w of the tether 66 is approximately one-half of the width W of the knuckle 60. In other examples, the width w of the tether 66 can be less than one-half of the width W of the knuckle. In still other examples, the ratio of the width w of the tether 66 to the width W of the knuckle 60 can have other values including two-thirds, one-third, or less than or equal to one-third.

The tether 66, as shown, can have an offset shape that includes two arms that extend in a direction away from the base surface 26. The tether 66 can include a first arm 74 and a second arm 78 (FIG. 5). The first arm 74 can be generally aligned with an inner surface of the knuckle 60. The second arm 78 can be laterally offset from the first arm 74 and can be angled away from the periphery of the grommet 24 and/or toward the knuckle 60. In alternate examples, the second arm 78 can lie in a plane parallel to the first arm 74 but laterally offset in a direction toward the periphery of the grommet 24. The first arm 74 and the second arm 78 can be connected with a connecting portion 82. In this example shown, the connecting portion 82 is oriented horizontally or in a plane generally parallel to the base surface 26. In other examples (including the example discussed below), the tether 66 can have other shapes and configurations.

Figure 13:
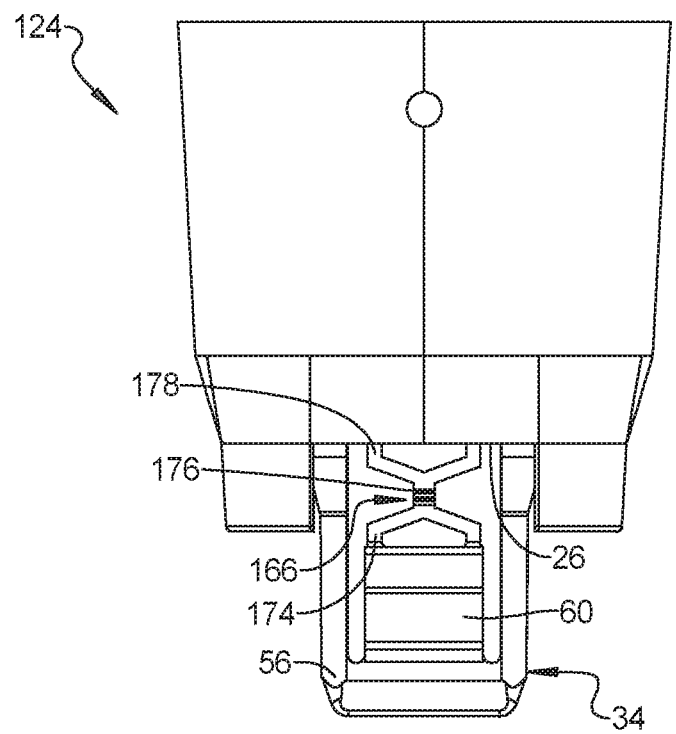
FIG. 13 is a side elevation view of another example grommet of a pin and grommet fastener in accordance with this disclosure.
Figure 14:
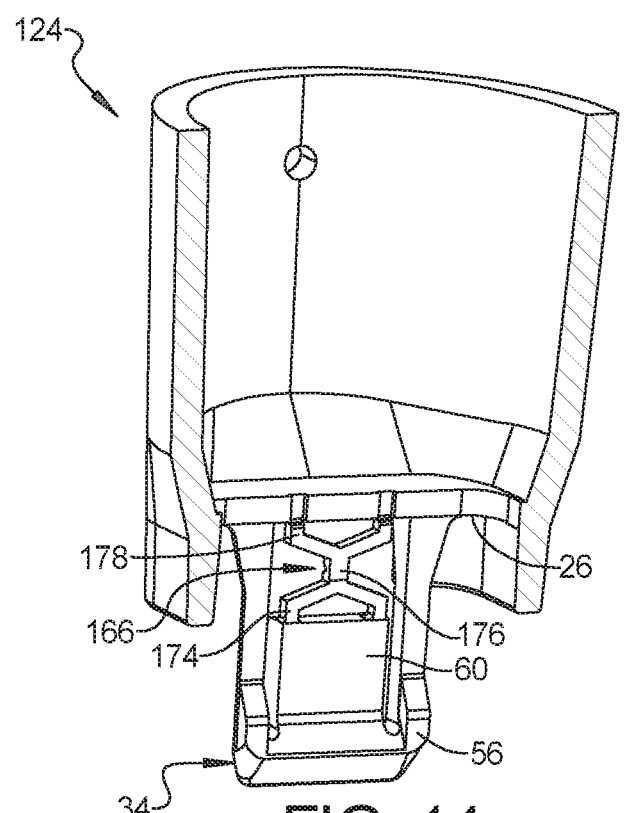
FIG. 14 is a perspective sectional view of the grommet of FIG. 13.

Referring to FIGS. 13 and 14, other examples of a pin and grommet fastener can include a grommet 124. The grommet 124 in this example is similar to the grommet 24 previously described but includes a tether 166 having a different shape and configuration from that of tether 66 previously described. In this example, the tether 166 is joined to the knuckle 60 between an end of the knuckle 60 and the base surface 26 of the grommet 124. The tether 166 can have an X-shape. The tether 166 can include a first portion 174 that is joined at the end of the knuckle 60 and a second portion 178 that is joined to the base surface 26. The first portion 174 and the second portion 178 can be joined to each other and include a hinge 176 that permits the first portion 174 to move relative to the second portion 178. In such a configuration, the knuckle 60 can move relative to the frame 56 in a direction toward a center of the grommet 124. The tether 166 can additionally limit movement of the knuckle 60 in a direction outward toward a periphery of the grommet 124 relative to the frame 56.

Returning to FIGS. 1-12, the pin and grommet fastener 20 can be assembled into a shipping position or configuration as illustrated in FIG. 9 and discussed herein. The pin and grommet fastener 20 can be in this shipping position when it is initially inserted into the joining part 22. An outer surface of the knuckle 60 of each leg member 34 can have an outwardly convex or angled shape. This outer surface of the knuckle 60 can contact the edge of the joining aperture 62 during insertion, causing each knuckle 60 to move slightly in a laterally inwardly direction indicated by arrows LI in FIG. 10. This helps insure the pin 36 is properly positioned for insertion. If it is not, then the fastener 20 simply will not be able to be inserted into the joining aperture.

Figure 6:
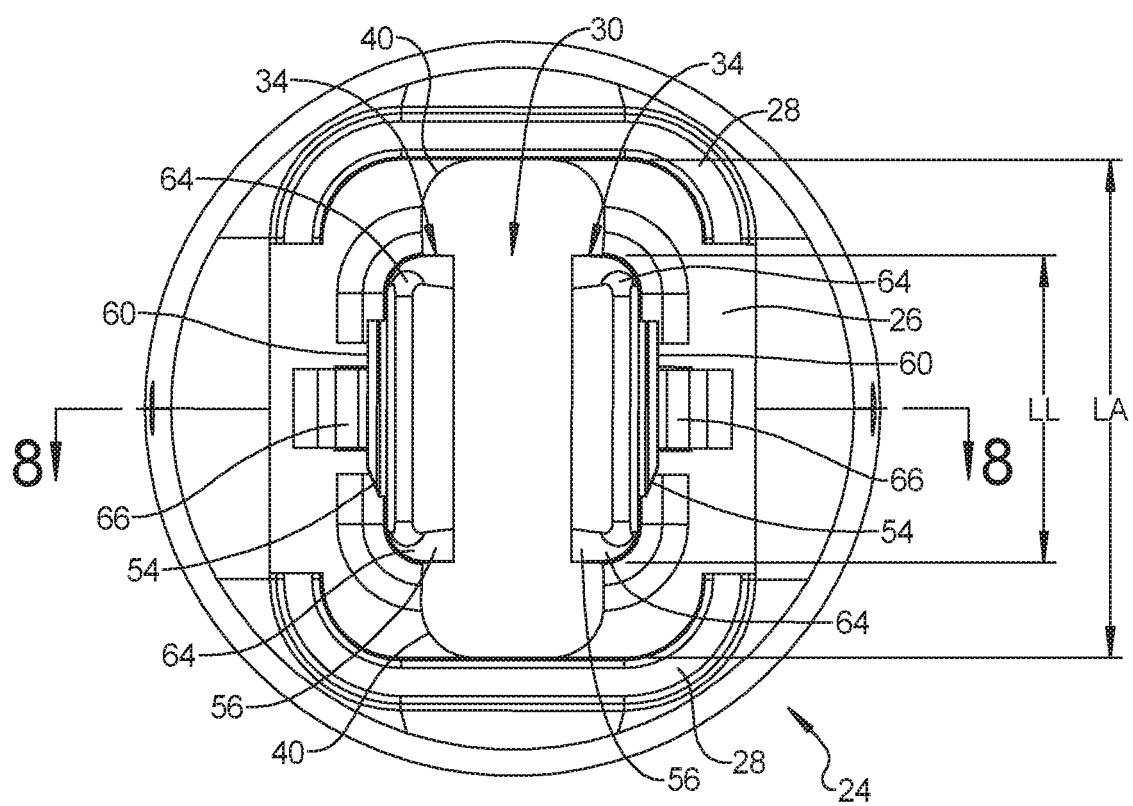
FIG. 6 is a bottom plan view of the grommet of the pin and grommet fastener of FIG. 1.

As can be seen in FIGS. 1 and 6, for example, the outer surface of the knuckle 60 projects outwardly beyond the columns 64 of the frame 56. As can be appreciated, the edge of the joining aperture 62, therefore, contacts the outer surfaces of the knuckles 60 and moves the knuckles 60 inwardly in the direction as indicated by arrows LI in FIG. 10. Since the knuckles 60 can move relative to the frame 56, the insertion force required to insert the pin and grommet fastener 20 into the joining panel 22 is lower than would otherwise be required if the knuckle 60 was fixed relative to the frame 56 and the entirety of each leg member 34 flexed inwardly during insertion. Instead, the pin and grommet fastener 20 of the present disclosure is easier to insert into the joining panel 22 because each knuckle 60 can move inwardly relative to each respective frame 56 about a hinge 86 (FIGS. 4 and 5) between the knuckle 60 and the frame 56.

Figure 10:
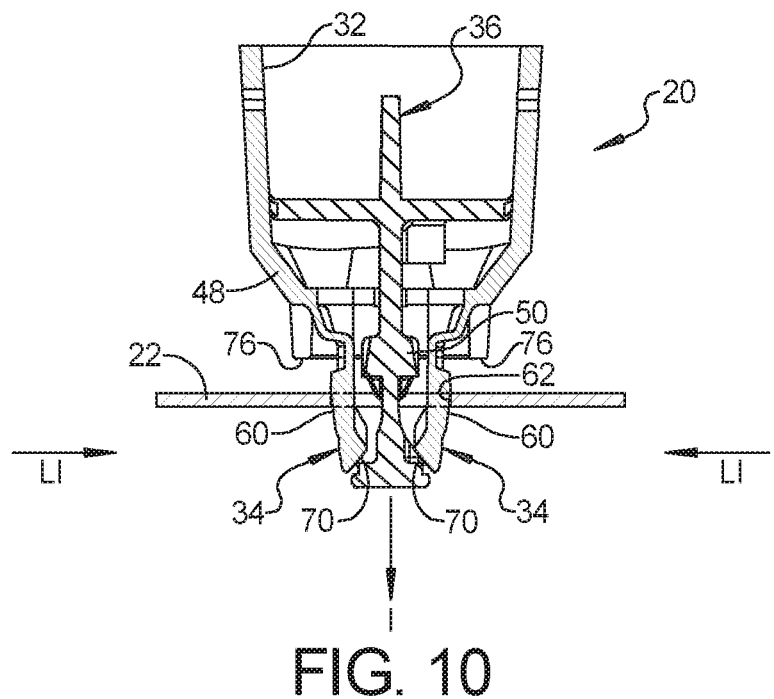
FIG. 10 is a cross-sectional view of the pin and grommet fastener of FIG. 1 initially engaging a joining part during insertion.
Figure 11:
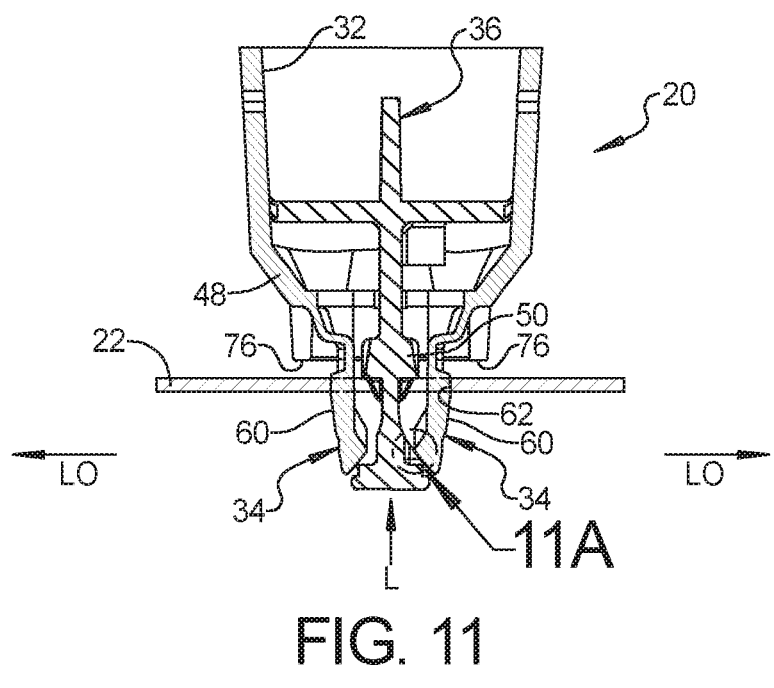
FIG. 11 is a cross-sectional view of the pin and grommet fastener of FIG. 1 with a joining part engaging the driving protrusion and driving the pin toward the second position relative to the grommet during insertion.
Figure 11A:
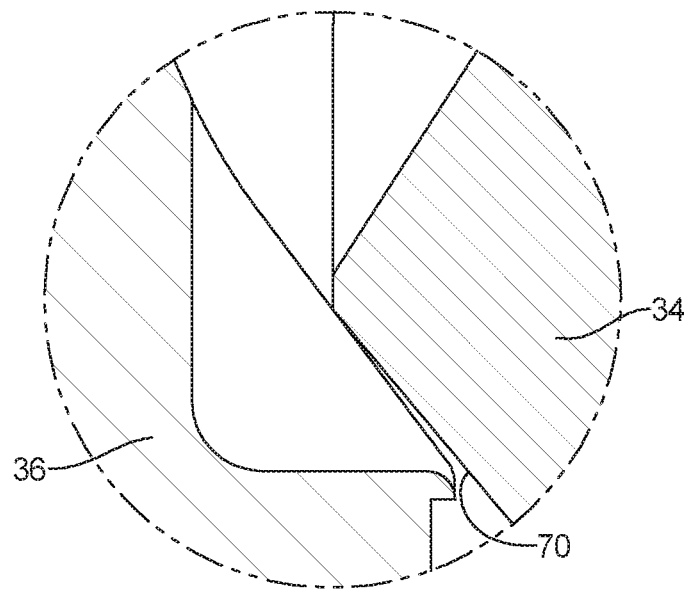
FIG. 11A is a magnified view of a portion of FIG. 11 showing cooperating locking surfaces of the pin and the grommet as the pin moves toward the second position relative to the grommet during insertion.
Figure 12:
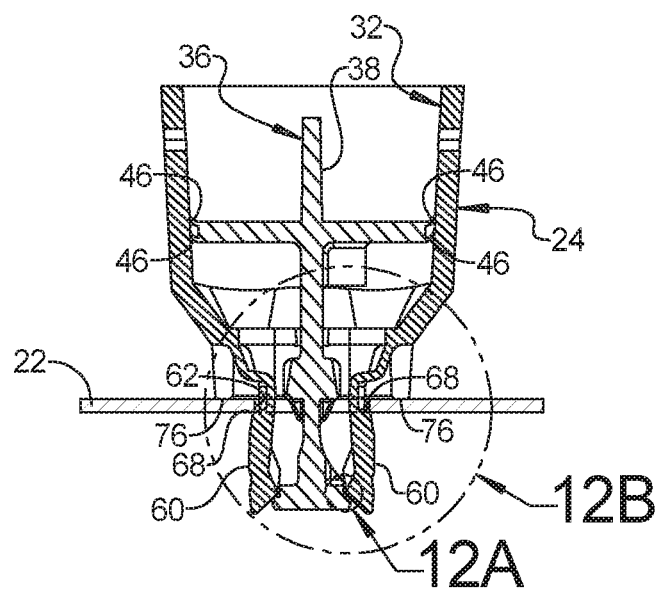
FIG. 12 is a cross-sectional view of the pin and grommet fastener of FIG. 1 with the pin in the second position relative to the grommet wherein the pin and grommet fastener is finally and fully locked to the joining part.
Figure 12A:
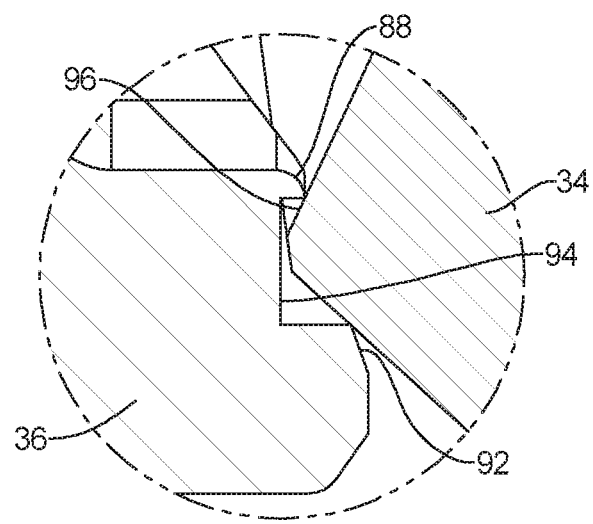
FIG. 12A is a magnified view of a portion of FIG. 12 showing the cooperating locking surfaces of the pin and the grommet with the pin in the second position wherein the pin and grommet fastener is finally and fully locked to the joining part.

As the knuckles 60 move laterally inwardly toward each other, cam surfaces 70 can engage the pin 36 and can cause the pin 36 to move in the insertion direction as indicated in FIG. 10. If, however, the pin 36 is not in the shipping position and is instead positioned too far in the driving direction (such as illustrated in FIG. 12), then the fastener 20 will not be able to be inserted into the joining aperture 62. Not only can this provide an indication to the user that something is wrong, but it can also prevent the fastener 20 from being improperly inserted into the joining aperture 62 without being properly locked to the joining part 22.

As the insertion process continues, the periphery of the joining aperture 62 engages the driving protrusion 50 and causes the pin 36 to move in the locking direction (indicated by arrow L, FIG. 11) relative to the grommet 24. The cam surfaces 70 operate to move the leg members 34 of the grommet 24 in a laterally outward or expanded direction as indicated by arrows LO in FIG. 11. Since the cam surfaces 70 engage the pin 36 at a position on the frame 56 and/or at a position beyond the hinge 86 (i.e., below the hinge 86, as illustrated), the cam surfaces 70 will move the frames 56 and the knuckles 60 of each leg member 34 in the laterally outward or expanded direction rather than moving only the knuckles 60. Continued insertion of the fastener 20 into the joining aperture 62 continues to move the locking bar or driving protrusion 50 until the pin 36 reaches a second, or fully-locked position relative to the grommet 24 as illustrated in FIG. 12. In this final or fully-locked position, the leg members 34 are in their fully laterally expanded shape, preventing the fastener 20 from being withdrawn from the joining aperture 62.

In the second, fully-locked configuration as illustrated in FIG. 12, the joining part 22 can be held against a contact surface 76 of the grommet 24. The joining aperture 62 can be held or even biased against the contact surface 76 by, for example, an end of the knuckle 60 or by an edge of the outer surface, which can include a retention surface, such as undercut 68, providing a shaped ledge or protrusion that presses against a surface of the joining part 22 at or near the periphery of the joining aperture 62.

Second cooperating locking surfaces 94 and 96 of the pin 36 and the leg members 34, respectively, can operate to hold the leg members 34 in their laterally expanded or locked position. In the illustrated example, the cooperating locking surfaces 94 of the pin 36 are bounded by projections 88 and 92 that help retain the cooperating locking surface 96 of each leg member 34 positioned adjacent the respective cooperating locking surface 94 of the pin 36. As shown in FIG.

12A, the cooperating locking surface 96 can be shaped as a projection with a suitable shape to resist movement of the pin 36 relative to the grommet 24. Referring back to FIG. 12, in the second, fully-locked position, the seal members 46 can be positioned within the tubular portion 32 to seal the central aperture 30 of the grommet 24.

The pin and grommet fastener 20 can automatically move into a final and locked, second position. In this context, "automatically" is used herein to mean that the fastener 20 is moved into the final and locked, second position simply as a result of the fastener 20 being inserted into the joining aperture 62. In other words, no additional or separate step or operation is required to fully or finally lock the fastener 20 to the joining part after inserting the assembled pin and grommet fastener 20 into the joining aperture 62. This is in contrast to pin and grommet fasteners, including screw and grommet fasteners, that require a grommet and pin or screw to be assembled or combined while they are within a joining aperture, and/or that require a pin or screw be manipulated relative to a grommet after insertion into a joining aperture.

In the second or fully-locked position as shown in FIG. 12, the pin and grommet fastener 20 resists movement of the joining panel 22 relative to the pin and grommet fastener 20. The pin and grommet fastener 20 can resist pull-out forces, for example. The pin and grommet fastener 20 of the present disclosure is an improvement over other pin and grommet fasteners because the knuckle 60 can robustly engage the joining panel 22 when the pin and grommet fastener 20 experiences a pull-out force.

Figure 12B:
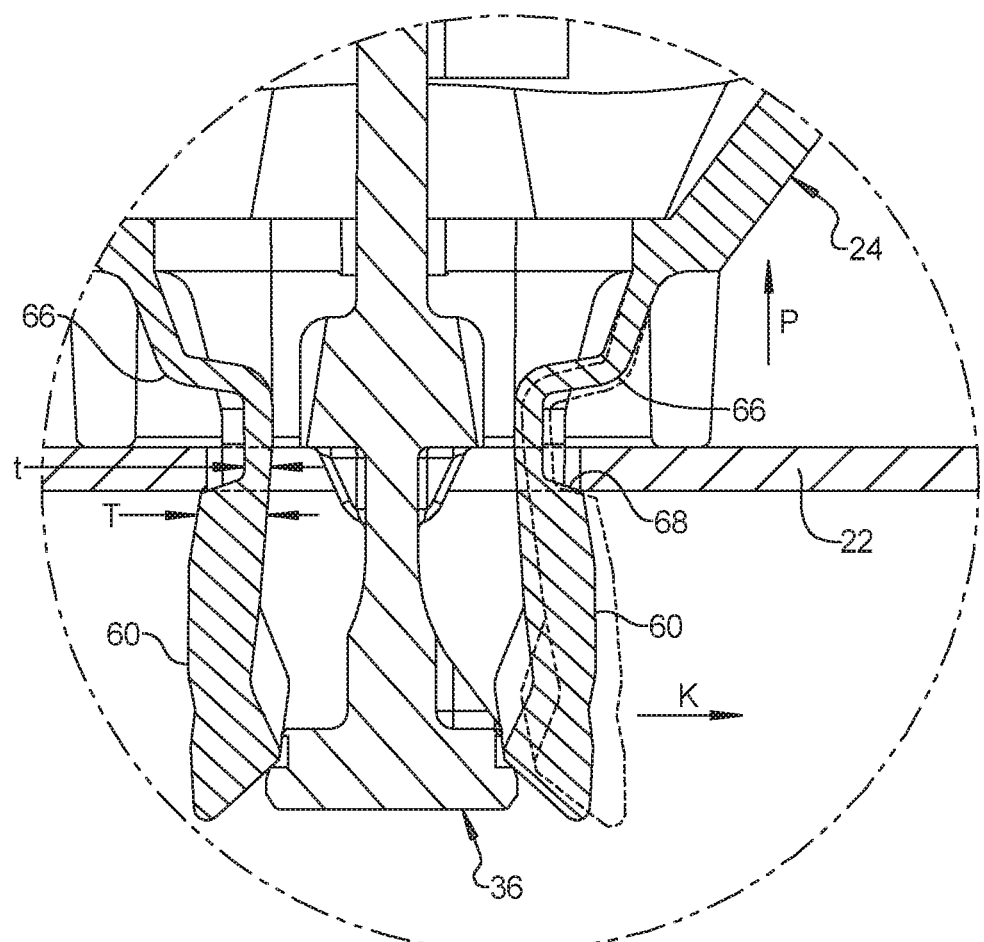
FIG. 12B is a magnified view of a portion of FIG. 12 showing the tether and knuckle relative to the joining part and illustrating the tether's and the knuckle's reaction to an attempted removal of the pin and grommet fastener from the joining part.

As shown in FIG. 12B, for example, the grommet 24 can experience a pull-out force in a general direction indicated by the arrow P. The pin and grommet fastener 20 can experience a pull-out force during normal use or when a technician desires to service or repair the components joined by the pin and grommet fastener 20. When such an external force is applied, the knuckle 60 can move outwardly as the tether 66 tends to straighten or flex from its offset shape (as shown in the dashed lines). As the knuckle 60 moves outwardly in a direction K indicated in FIG. 12B, the retention surface or undercut 68 of the knuckle 60 can engage the joining panel 22 more aggressively and reduce the likelihood that the pull-out force will result in removal of the pin and grommet fastener 20 from the joining panel 22. The movement of the knuckle 60 can be different or more limited than the movement that is illustrated in FIG. 12B. The movement of the knuckle 60 shown in FIG. 12B is for illustrative purposes only. One or more localized regions of the knuckle 60 can move or more aggressively engage the joining panel 22 instead of the entire knuckle 60 moving as shown. For example, a retention surface of the knuckle 60 that includes the undercut 68 may move or flex outwardly to further engage the joining panel 22 when the grommet 24 experiences a pull-out force. With such limited movement and/or flexing, the knuckle 60 can remain engaged to the joining panel 22 during a pull-out force event.

During servicing, the pin and grommet fastener 20 can be disengaged from the joining panel 22 and be reused to re-join the pin and grommet fastener 20 to the joining panel 22. In example pin and grommet fasteners that do not include the tether 66, there is a risk that a pull-out force could result in the knuckle 60 being pulled outward from the frame 56 and folded back against the frame 56. In such fasteners without the tether 66, the knuckle 60 can move in the direction K and continue rotating relative to the frame 56 about the hinge 86 until the knuckle 60 is moved approximately 180 degrees from its original position. If the knuckle 60 were to be folded outward in such a manner, the pin and grommet fastener 20 could be damaged such that it could not be reused or reinstalled after service or repair of the joined parts.

In this example, however, the tether 66 limits the knuckle 60 from moving relative to the frame 56. In particular, the tether 66 limits the knuckle 60 from moving in an outward lateral direction relative to the frame 56. The tether 66 can permit a limited amount of outward lateral movement but limits the knuckle 60 from moving such that the knuckle 60 would be permanently damaged and not be able to be reused after servicing or repair. The tether 66, for example, can limit the knuckle 60 from moving beyond a predetermined distance. Such predetermined distance can correspond to a distance beyond which the knuckle 60 would sustain permanent damage that would prevent re-use of the pin and grommet fastener 20. As previously discussed, the tether 66 can also include the second arm 78 (or other suitable feature) that can bias the knuckle 60 to its original position (relative to the frame 56) after permitting limited lateral outward movement.

During servicing, repair or maintenance of the parts joined using the pin and grommet fastener 20, a user can grasp the service tab 38 and withdraw the pin 36 (upwardly in the figures) from the grommet 24. Such removal of the pin 36 allows the leg members 34 to return to their original, laterally unexpanded shape, which allows the grommet 24 to be withdrawn from the joining aperture 62 of the joining part 22. Thus, projections 88, 92 can have a size and shape to resist the withdrawal of the pin 36 from the grommet 24 during normal use, but allow such withdrawal upon application of a sufficient force to the grasping service tab 38. For example, a user may need to grasp the service tab 38 with needle nose pliers or a similar tool in order to apply a sufficient force to cause the locking surface 84 of the grommet 24 to move past the projection 88 of the pin 36.

Related methods of manufacturing a pin and grommet fastener 20 should be apparent from the above discussion. For example, such methods can include providing the pin and grommet fastener 20 with any combination of the features described herein. Assembling the pin 36 and the grommet 24 into the shipping configuration can include inserting the pin 36 in an insertion direction (indicated by arrow I) into the central aperture 30 of the grommet 24 from a side of the grommet 24 that is opposite the base surface 26 to the longitudinally extending leg members 34. Providing the laterally extending sealing members 46 can include molding the pin 36 in a two-shot molding process, where the laterally extending sealing members 46 are molded in a second shot of a material that is more flexible than a material of another portion of the pin 36 that is molded in a first shot. Similarly, an over-molding process can be used in which at least an exterior portion of the laterally extending sealing members 46 are molded over a less flexible material of another portion of the pin 36.

Similarly, related methods for insertion locking a pin and grommet fastener 20 into a joining part 22 should be apparent from the above discussion. For example, driving the pin 36 into the second, final locked configuration can position the laterally extending sealing members 46 to seal against a tubular portion 32 of the central aperture 30 of the grommet 24. Inserting the pin and grommet fastener 20 into the joining aperture 62 can engage a shaped outer surface of the knuckle 60 of the leg members 34 of the grommet 24 to cause the knuckles 60 to move laterally inwardly and relatively to the frame 56 and to engage cam surfaces 70 of the leg members 34, respectively, to move the pin 36 in a direction away from the second position (indicated by arrow I).

In the final locked configuration cooperating locking surfaces, 96 and 94, of each longitudinally extending leg member 34 and the pin 36, respectively, engage against each other and can retain the longitudinally extending leg members 34 in the laterally expanded state via protrusions, 88 and 92 bounding at least one of the cooperating locking surfaces 96 and 94. Driving the pin 36 into the final locked configuration can engage an outer shaped surface of the knuckle 60 of the longitudinally extending leg members 34 against an outer face of the joining panel 22 to bias the joining panel 22 against the contact surfaces 76 of the grommet 24. For example, a retention surface or undercut 68 can provide a surface that presses against the surface of the joining part 22 defining the periphery of the joining aperture 62.

Further, when the pin and grommet fastener 20 is in the final locked position, the tether 66 can move the knuckle 60, or at least a portion thereof, in an outward direction and/or toward an edge of the joining aperture 62 to engage the joining panel 22 to resist the disengagement of the knuckle 60 from the joining panel 22 when a pull-out force is exerted on the pin and grommet fastener 20.

The terminology used herein is for the purpose of describing particular example embodiments only and is not intended to be limiting. As used herein, the singular forms "a," "an," and "the" may be intended to include the plural forms as well, unless the context clearly indicates otherwise. For example, the joining part or member 22 is illustrated herein as a single small plate member. The joining part 22 may actually include a plurality of parts or plates each with apertures that together form the joining aperture 62 into which the pin and grommet fastener 20 is inserted. Additionally, the joining part 22 is not limited to the illustrated flat planar shape or small size, but can include virtually any desired shape or size.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A pin and grommet fastener comprising:
a grommet defining a central aperture includes at least two adjacent longitudinally extending leg members, each of the at least two adjacent longitudinally extending members including:
a frame;
a knuckle connected to the frame at a hinge region, the hinge region designed to permit the knuckle to move relative to the frame and the knuckle including a retention surface at a proximal terminal end of the knuckle opposite the hinge region, the retention surface being designed to engage an edge of a joining aperture in a joining panel to retain the grommet to the joining panel when the pin is in a second position; and
a tether that is structurally distinct from the knuckle, and that extends from the proximal terminal end of the knuckle to a base surface of the grommet, the tether limiting movement of the knuckle relative to the frame; and
a pin;
wherein the pin and grommet have a first cooperating engagement coupling that engages to retain the pin in a first position relative to the grommet in which the at least two adjacent longitudinally extending leg members of the grommet are in a laterally unexpanded state; and
wherein the pin and grommet have a second cooperating engagement coupling that engages to retain the pin in the second position relative to the grommet in which the at least two adjacent longitudinally extending leg members of the grommet are in a laterally expanded state; and
wherein each of the first and second cooperating engagement couplings comprise a protrusion of a first of the pin and grommet received within a cooperating recess of a second of the pin and grommet to retain the pin in the first and second positions, respectively, relative to the grommet.

2. The pin and grommet fastener of claim 1, wherein the hinge region is positioned at a distal end of the knuckle and is designed to allow the knuckle to move in an inward lateral direction away from a periphery of the grommet when the knuckle contacts the edge of the joining aperture during insertion into the joining panel.

3. The pin and grommet fastener of claim 2, wherein the tether is connected to a proximal end of the knuckle opposite to the hinge region and is designed to limit the knuckle from moving in an outward lateral direction beyond a predetermined distance.

4. The pin and grommet fastener of claim 1, wherein a second end of the tether is connected to the base surface of the grommet at a position laterally outward of the retention surface of the knuckle, and the tether has a structure designed to pull the retention surface outward toward the edge of the joining aperture when the grommet experiences a pull out force.

5. The pin and grommet fastener of claim 1, wherein the tether has an offset shape that includes a first arm connected to a second arm, the first arm aligned with an inner surface of the knuckle and the second arm is laterally offset from the first arm toward a periphery of the grommet.

6. The pin and grommet fastener of claim 5, wherein the tether includes a connecting portion that extends laterally outward from the first arm and connects the first arm to the second arm.

7. The pin and grommet fastener of claim 6, wherein the second arm is angled toward a proximal end of the knuckle to permit the knuckle to flex relative to the frame in a laterally inward direction away from a periphery of the grommet when the knuckle is contacted by an edge of a joining aperture on a joining panel and to bias the knuckle back to an original position relative to the frame.

8. The pin and grommet fastener of claim 1, wherein insertion ends of the at least two adjacent longitudinally extending leg members are separated from each other by the central aperture.

9. The pin and grommet fastener of claim 1 comprising first and second separate, independent components, wherein the first separate, independent component comprises the pin and the second separate, independent component comprises the grommet.

10. The pin and grommet fastener of claim 1, wherein the knuckle is spaced apart from the frame along at least a portion of longitudinally extending sides of the knuckle.

11. The pin and grommet fastener of claim 1 wherein each frame includes two longitudinally extending column portions with the knuckle disposed therebetween.

12. The pin and grommet fastener of claim 11 wherein the two longitudinally extending column portions are connected by a laterally extending crossbar, and wherein the hinge region is disposed at a location at which the knuckle is connected to the crossbar.

13. The pin and grommet fastener of claim 1 wherein the pin further comprises a driving protrusion extending laterally outward beyond sides of the at least two adjacent longitudinally extending leg members, the driving protrusion designed to be automatically engageable against a periphery of a joining aperture of a joining part during insertion of the pin and grommet fastener into the joining aperture to drive the pin from the first position to the second position relative to the grommet to lock the pin and grommet fastener to the joining part.

14. A pin and grommet fastener comprising:
a grommet defining a central aperture includes at least two adjacent longitudinally extending leg members, each of the at least two adjacent longitudinally extending leg members including:
a frame;
a knuckle connected to the frame at a hinge region, the hinge region designed to permit an outer surface of the knuckle to move laterally toward a center of the central aperture relative to the frame when the pin and grommet fastener is inserted into a joining panel; and
a tether connected to a proximal end of each knuckle opposite to the hinge region and to a base surface of the grommet, each tether being connected to the base surface of the grommet at a position laterally outward of a respective one of the at least two adjacent longitudinally extending leg members; and
a pin;
wherein the pin and grommet have a first cooperating engagement coupling that engages to retain the pin in a first position relative to the grommet in which the at least two adjacent longitudinally extending leg members of the grommet are in a laterally unexpanded state;
wherein the pin and grommet have a second cooperating engagement coupling that engages to retain the pin in a second position relative to the grommet in which the at least two adjacent longitudinally extending leg members of the grommet are in a laterally expanded state;
wherein each of the first and second cooperating engagement couplings comprise a protrusion of a first of the pin and grommet received within a cooperating recess of a second of the pin and grommet to retain the pin in the first and second positions, respectively, relative to the grommet; and
wherein each knuckle has a retention surface, at least a portion of the retention surface being positioned laterally outward of the frame to engage an edge of a joining aperture in the joining panel to retain the pin and grommet fastener relative to the joining panel when the pin is in the second position.

15. The pin and grommet fastener of claim 14 wherein the tether has a structure designed to limit the knuckle from moving in an outward lateral direction beyond a predetermined distance.

16. The pin and grommet fastener of claim 15, wherein the at least two adjacent longitudinally extending leg members extend from the base surface of the grommet.

17. The pin and grommet fastener of claim 14, wherein the hinge region is positioned toward a distal end of the knuckle at which the knuckle is joined to the frame, the retention surface of the knuckle designed to move laterally outward with a respective one of the at least two adjacent longitudinally extending leg members when the pin is in the second position and the at least two adjacent longitudinally extending leg members are in the laterally expanded state.

18. The pin and grommet fastener of claim 14 wherein the pin further comprises a driving protrusion extending laterally outward beyond sides of the at least two adjacent longitudinally extending leg members, the driving protrusion designed to be automatically engageable against a periphery of a joining aperture of a joining part during insertion of the pin and grommet fastener into the joining aperture to drive the pin from the first position to the second position relative to the grommet to lock the pin and grommet fastener to the joining part.

19. A pin and grommet fastener comprising:
a grommet defining a central aperture includes at least two adjacent longitudinally extending leg members, each of the at least two adjacent longitudinally extending leg members including:
a frame;
a knuckle joined to the frame at a distal end of the knuckle and having a retention surface at a proximal terminal end of the knuckle opposite the distal end of the knuckle, the knuckle being spaced apart from the frame along at least a portion of longitudinally extending sides of the knuckle, the knuckle being designed to move laterally inward relative to the frame during insertion of the pin and grommet fastener into a joining aperture of a joining part; and
a tether that is structurally distinct from the knuckle, and that extends from the proximal terminal end of the knuckle to a base surface of the grommet, the tether limiting lateral outward movement of the knuckle relative to the frame during removal of the pin and grommet fastener from the joining aperture; and
a pin;
where n the pin and grommet have a first cooperating engagement coupling that engages to retain the pin in a first position relative to the grommet in which the at least two adjacent longitudinally extending leg members of the grommet are in a laterally unexpanded state;
wherein the pin and grommet have a second cooperating engagement coupling that engages to retain the pin in a second position relative to the grommet in which the at least two adjacent longitudinally extending leg members of the grommet are in a laterally expanded state;
wherein each of the first and second cooperating engagement couplings comprise a protrusion of a first of the pin and grommet received within a cooperating recess of a second of the in and grommet to retain the pin in the first and second positions, respectively, relative to the grommet; and
wherein the pin includes a driving protrusion extending laterally outward beyond sides of the at least two adjacent longitudinally extending leg members, the driving protrusion designed to be automatically engageable against a periphery of the joining aperture of the joining part during insertion of the pin and grommet fastener into the joining aperture to drive the pin from the first position to the second position relative to the grommet to lock the pin and grommet fastener to the joining part.

20. The pin and grommet fastener of claim 19, wherein protrusion or recess of pin of the second cooperating engagement coupling is positioned at or near an insertion end of the pin to laterally expand the at least two adjacent longitudinally extending leg members to the laterally expanded state.

21. The pin and grommet fastener of claim 19, wherein:
the pin and grommet fastener is designed to be inserted into a joining panel in an insertion direction;
the second position of the pin relative to the grommet is in a driving direction from the first position; and
the driving direction is opposite to the insertion direction.

22. The pin and grommet fastener of claim 19 wherein each knuckle defines a retention surface to bias the joining part against a contact surface of the grommet when the pin is in the second position relative to the grommet.

23. The pin and grommet fastener of claim 19 wherein the pin and the grommet are separate, independent components.

* * * * *

UNITED STATES PATENT AND TRADEMARK OFFICE
CERTIFICATE OF CORRECTION

PATENT NO. : 10,900,513 B2
APPLICATION NO. : 16/373275
DATED : January 26, 2021
INVENTOR(S) : Tien The Diep et al.

It is certified that error appears in the above-identified patent and that said Letters Patent is hereby corrected as shown below:

In the Claims

Claim 19, Column 14, Line 45, delete "where n" and insert --wherein-- therefor

Signed and Sealed this
Twenty-third Day of March, 2021

Drew Hirshfeld
*Performing the Functions and Duties of the
Under Secretary of Commerce for Intellectual Property and
Director of the United States Patent and Trademark Office*